(12) United States Patent
Limberg

(10) Patent No.: US 6,573,948 B1
(45) Date of Patent: Jun. 3, 2003

(54) EQUALIZING INTERMEDIATE-FREQUENCY SIGNALS BEFORE DEMODULATING THEM IN A DIGITAL TELEVISION RECEIVER

(75) Inventor: Allen Le Roy Limberg, Vienna, VA (US)

(73) Assignee: Samsung Electronics Co., Ltd., Kyungki-do (KR)

( * ) Notice: Subject to any disclaimer, the term of this patent is extended or adjusted under 35 U.S.C. 154(b) by 478 days.

(21) Appl. No.: 09/603,376

(22) Filed: Jun. 26, 2000

Related U.S. Application Data
(60) Provisional application No. 60/140,751, filed on Jun. 25, 1999.

(51) Int. Cl.[7] ............................. H04N 5/21; H04N 5/213
(52) U.S. Cl. ........................................ 348/614; 375/346
(58) Field of Search ............................... 348/614, 607, 348/611, 21, 914, 725; 375/346, 349, 348, 321; H04N 5/21, 5/213

(56) References Cited

U.S. PATENT DOCUMENTS

| | | | | |
|---|---|---|---|---|
| 5,606,579 A | * | 2/1997 | Patel et al. .................. | 375/321 |
| 5,731,848 A | * | 3/1998 | Patel et al. .................. | 348/614 |
| 5,781,463 A | * | 7/1998 | Ogawa et al. ............... | 708/322 |
| 6,124,898 A | * | 9/2000 | Patel et al. .................. | 348/607 |
| 6,380,969 B1 | * | 4/2002 | Limberg ....................... | 348/21 |

* cited by examiner

*Primary Examiner*—Michael H. Lee
(74) *Attorney, Agent, or Firm*—Sughrue Mion, PLLC

(57) ABSTRACT

Adaptive passband equalization filtering comprises in addition to a non-iterative portion, an iterative filtering portion to suppress longer-delayed post-ghosts. This iterative filtering portion differs from that in previous adaptive passband equalization filtering, in which the estimates of transmitted symbols are converted to VSB signal and the feedback signal for the iterative filtering is generated as a weighted summation of successive samples of the VSB signal. Instead, a weighted summation of successive estimates of transmitted symbols is converted to VSB signal to supply the feedback signal for the iterative filtering. Since the conversion to VSB signal is done immediately before the feedback signal is combined with the feedforward signal to generate the passband equalization filtering response that is demodulated, the carrier wave of the feedback signal is currently determined, rather than having been determined in the past. This avoids "ghost iteration with inversion" in the adaptive passband equalization filtering response.

6 Claims, 4 Drawing Sheets

EQUALIZING INTERMEDIATE-FREQUENCY SIGNALS BEFORE DEMODULATING THEM IN A DIGITAL TELEVISION RECEIVER

This application is filed under 35 U.S.C. 111(a) claiming pursuant to 35 U.S.C. 119(e)(1) benefit of the filing date of provisional application serial No. 60/140,751 filed Jun. 25, 1999, pursuant to 35 U.S.C. 111(b).

The present invention relates to receivers for digital television (DTV) signals, such as those employed for terrestrial broadcasting in the United States of America in accordance with the Advanced Television Systems Committee (ATSC) standard, and more particularly, to passband equalizers for digitized final-intermediate-frequency vestigial-sideband DTV signals in such receivers.

BACKGROUND OF THE INVENTION

Multi-path reception conditions give rise to ghosts in NTSC television reception. Ghost signals which arrive over a transmission path of lesser length than the strongest or "principal" signal are referred to as "pre-ghosts", and the ghost images they cause in a received television image appear to the left of the desired image. Pre-ghosts occurring in off-the-air reception can be displaced as much as ten or more microseconds from the "principal" signal, but typically displacements are no more than two microseconds. In cable reception direct off-the-air pick-up can precede the cable-supplied signal by as much as thirty microseconds, however. Ghost signals which arrive over a transmission path of greater length than the strongest or "principal" signal are referred to as "post-ghosts", and the ghost images they cause in a received TV image appear to the right of the desired image. Typically, the range for post-ghosts extends to forty microseconds displacement from the "principal" signal, with 70% or so of post-ghosts occurring in a sub-range that extends to ten microseconds displacement.

In cable reception the differential delays that ghosts exhibit with respect to the principal received signal are usually very short, leading to departure from flat amplitude response and uniform group delay in the transmission/reception channel. These ghosts are referred to as "micro-ghosts" to distinguish them from "macro-ghosts" exhibiting longer differential delays of at least a microsecond with respect to the principal received signal that are encountered in terrestrial broadcast DTV signals received over the air.

Equalization filtering can be carried out using a multiple-tap finite-impulse-response (FIR) digital filter. The weighting coefficients of such a filter can be adjusted to suppress the responses to multi-path signals, which exhibit differential delay with respect to the principal received signal. Since macro-ghosts are generally spaced apart from each other and from the principal received signal, it is a common practice to use filters with sparsely weighted coefficients for suppressing them, cascading such filters FIR filters with more densely weighted coefficients used for suppressing micro-ghosts. The filters with sparsely weighted coefficients are sometimes referred to as ghost-reduction filters, and the filters with more densely weighted coefficients are sometimes referred to as equalization filters. In this specification the term "channel equalization filtering" is used generically to refer to both types of filter and to cascade connections of such filters. Often the ghost-reduction filters with sparsely weighted coefficients are themselves cascade connections of an infinite-impulse-response (IIR) recursive digital filter and an FIR digital filter, each comprised of programmable bulk delay elements between successive taps from which differentially delayed signals are extracted for programmable weighting in weighted summation digital filtering procedures. Procedures for adjusting the coefficients of cascaded ghost-reduction and micro-ghost equalization filters are described by C. B. Patel and J. Yang in U.S. Pat. No. 5,331,416 issued Jul. 19, 1994 and entitled "METHODS FOR OPERATING GHOST-CANCELATION CIRCUITRY FOR TV RECEIVER OR VIDEO RECORDER". Apparatus and procedures for accumulating training signals for NTSC analog television signals are described by C. B. Patel and J. Yang in U.S. Pat. No. 5,600,380 issued Feb. 4, 1997 and entitled "GHOST-CANCELATION REFERENCE SIGNAL ACQUISITION CIRCUITRY, AS FOR TV RECEIVER OR VIDEO RECORDER".

Similar multi-path reception conditions obtain in digital television (DTV) systems. The effects of ghosts are not directly observable on the television viewing screen but instead interfere with the data slicing procedures employed to recover data from baseband symbol coding regenerated at the DTV receiver responsive to received DTV signals. Ghost suppression is effected by digital filtering techniques similar to those used with NTSC signals.

Receivers for DTV signals that digitize these signals after conversion to a final intermediate-frequency band and before demodulating the converted signals to regenerate baseband symbol coding are described by C. B. Patel and A. L. R. Limberg in U.S. Pat. No. 5,479,449 issued Dec. 26, 1995 and entitled "DIGITAL VSB DETECTOR WITH BANDPASS PHASE TRACKER, AS FOR INCLUSION IN AN HDTV RECEIVER". The receivers disclosed in U.S. Pat. No. 5,479,449 include equalization filtering, which is performed on the regenerated baseband symbol coding. U.S. Pat. No. 5,479,449 indicates a preference for adaptive weighting being done dependent on a ghost cancellation reference signal component of the regenerated baseband symbol coding. This method of adaptive weighting is preferred for initial adjustment of weighting in the channel equalization filtering as indicated in U.S. Pat. No. 5,648,987 issued Jul. 15, 1997 to J. Yang et alii and entitled "RAPID-UPDATE ADAPTIVE CHANNEL-EQUALIZATION FILTERING FOR DIGITAL RADIO RECEIVERS, SUCH AS HDTV RECEIVERS". Thereafter, as indicated in U.S. Pat. No. 5,479,449 the adaptation of the channel-equalization filtering can be performed on a decision-feedback basis using all received symbols, which better permits the tracking of changing multipath conditions.

In U.S. patent application Ser. No. 09/335,516 filed Jun. 18, 1999 and entitled "DIGITAL TELEVISION RECEIVER WITH EQUALIZATION PERFORMED ON DIGITAL INTERMEDIATE-FREQUENCY SIGNALS" C. B. Patel and A. L. R. Limberg point out that performing equalization on the digitized final intermediate-frequency (final-IF) signal, rather than on the regenerated baseband symbol coding, is preferable for a number of reasons. First, there is no spectrum folding of the differentially delayed signals prior to equalization, to complicate equalization of the double-sideband portions of the DTV signal. Second, the appropriate delay of low baseband frequencies is not difficult to implement. Third, the effects of the local oscillator AFPC loop help, rather than interfere with, equalization procedures. Fourth, equalization can be effected on co-channel NTSC as well as on the DTV signals without need for separate equalization filtering, as required if baseband equalization of the two types of signal is to be done; this is helpful when co-channel NTSC signals are to be analyzed for their effects on DTV signals.

Performing equalization on the digitized final intermediate frequency presents the problem that the channel equalization filter response being in the passband is unsuitable for the generation of adjustments to the adaptive weighting coefficients therein. The decision-feedback techniques used in prior art quadrature-amplitude-modulation (QAM) data communications receivers for demodulating the passband equalizer response, generating decision-feedback error signal in the baseband, computing weighting coefficients for a hypothetical baseband equalizer, and then applying lowpass-to-bandpass transformation procedures to generate weighting coefficients for the passband equalizer are inappropriate for VSB data communications receivers because the lowpass-to-bandpass transformation procedure is inapplicable.

A digital television receiver constructed in accordance with U.S. patent application Ser. No. 09/335,516 digitizes received digital television signal, as converted in frequency to a final intermediate-frequency band close to baseband, and then performs the adaptive channel equalization filtering on the digitized signal before demodulating it in the digital regime to regenerate baseband symbol coding. That is, equalization is done on a passband basis to the final I-F band close to baseband, rather than equalization being done on a baseband basis. Initial adjustment of the weighting coefficients is preferably done using selected portions of the data field synchronizing signal as a ghost cancellation reference signal, in order that convergence of the weighting coefficients to desired values proceeds more rapidly. Thereafter, adjustment of the weighting coefficients is preferably done using decision-feedback methods that are continuously employed on all regenerated baseband symbols, better to track changing multipath conditions should they occur.

It is a practical necessity that passband equalization be fractional equalization, in order to sample the final I-F signal sufficiently frequently to support its demodulation. A baseband signal descriptive of symbol coding is recovered by demodulation. In a digital television receiver constructed in accordance with U.S. patent application Ser. No. 09/335,516 this baseband signal is subjected to rate reduction filtering, or decimation, to reduce its sampling rate to symbol rate. At this reduced rate, the baseband signal can be quantized to generate estimates of transmitted symbols.

U.S. patent application Ser. No. 09/335,516 points out that detection of decision feedback error signal is preferably done by generating a VSB signal that is compared to the passband equalization filter response. U.S. patent application Ser. No. 09/335,516 points out that the VSB signal is preferably generated the following way. The estimates of transmitted symbols are re-sampled to the sampling rate used in the adaptive channel equalization filtering. The re-sampled estimates of transmitted symbols are used to modulate the amplitude of a carrier signal. The resulting amplitude-modulation signal is filtered to generate the VSB signal that is compared to the passband equalization filter response.

Provisional U.S. patent application Serial No. 60/130,566 titled "PASSBAND EQUALIZERS WITH FILTER COEFFICIENTS CALCULATED FROM MODULATED CARRIER SIGNALS" filed Apr. 4, 1999 for A. L. R. Limberg and C. B. Patel describes passband equalization filtering in further detail.

Carrier jitter has been a long-standing problem in the design of channel equalization filtering for digital communications receivers. This problem is particularly vexatious in DTV receivers for VSB signals transmitted in accordance with the ATSC standard. The ATSC standard does not provide for band-reject filtering of amplitude-modulation (AM) energy in a narrow band centered on carrier. The ATSC standard prescribes asymmetrical transmitter response to the AM energy immediately flanking the carrier, which exacerbates carrier jitter problems in a DTV receiver. U.S. Pat. No. 5,479,449 prescribes narrow bandpass filtering in the carrier region for reducing the carrier jitter problem. More recently, A. L. R. Limberg in a provisional patent application serial No. 60/132,874 filed May 5, 1999 and titled "DIGITAL TELEVISION RECEIVER CONVERTING VESTIGIAL-SIDEBAND SIGNALS TO DOUBLE-SIDEBAND AM SIGNALS BEFORE DEMODULATION" has described DTV receivers which convert the VSB DTV signal to a symmetrical-double-sideband AM signal for demodulation. The problem of carrier jitter owing to AM sideband asymmetry can be completely solved with this type of receiver.

DTV receivers designed in accordance with principles set forth in the patents and patent applications described above provide satisfactory performance so long as the various principal reception paths comprised within the transmission channel are unchanging. The principal problems in passband equalization filtering that remain in these DTV receivers concern rapid change in one or more of the various principal reception paths comprised within the transmission channel, a condition which those in the art refer to as "dynamic multipath distortion". Methods that update equalization and ghost cancellation filtering parameters as rapidly as possible aid in to tracking rapid changes in dynamic multipath distortion. The faster data-directed methods that are known do not rely on algorithms implemented in software, but instead rely on an ancillary digital filter operative on decision-feedback error signals for generating updating of the equalization and ghost cancellation filtering parameters. U.S. Pat. No. 5,648,987 describes a block-LMS method for updating equalization and ghost cancellation filtering parameters that utilizes such an ancillary digital filter. U.S. Pat. No. 5,901,175 issued May 4, 1998 to A. L. R. Limberg and titled "DYNAMICALLY ADAPTIVE EQUALIZER SYSTEM AND METHOD" describes a continuous LMS method for updating equalization and ghost cancellation filtering parameters that utilizes a pipe-line ancillary digital filter.

Even when methods of high-speed updating of equalization and ghost cancellation filtering parameters are employed, there is a remaining problem with passband equalization filtering being able to cope with rapid dynamic multipath distortion. This problem, believed not to have been previously recognized, is particularly pernicious in passband equalization filtering that comprises in addition to a non-iterative portion, an iterative filtering portion to suppress longer-delayed post-ghosts, as described in U.S. patent applications Ser. No. 09/335,516 and No. 60/130,566. The problem arises because the data communications radio receiver is synchronized using the passband equalization filtering response. That is, the carrier wave used for synchronously detecting the received signal is generated with reference to timing derived from the passband equalization filtering response. The passband samples stored in the iterative filtering loop describe signals the carrier wave of which corresponds to a carrier wave the data communications radio receiver was previously synchronized with. The decision feedback method for adapting equalization filtering parameters depends on the constancy of the relative phase relationship of the feedforward passband signal through the non-iterative portion of the passband equalization filtering and of the feedback passband signal through the iterative portion of the passband equalization filtering.

When the multipath distortion is static in nature, the carrier wave that the data communications radio receiver is currently synchronized with and the carrier wave that the data communications radio receiver was previously synchronized with have fixed phase relationships relative to each other. The carrier wave of the feedback passband signal depends on the carrier waves of previous feedforward passband signals. Since there has been no change in multipath distortion to force changed adjustment of the synchronization of the data communications radio receiver, these previous feedforward passband signals are in fixed relative phase relationship to the current feedforward passband signal. Adaptation of the passband equalization filtering by the decision-feedback methods described in U.S. patent applications Ser. No. 09/335,516 and No. 60/130,566 presents no apparent problem.

When the multipath distortion is dynamic in nature, the carrier wave that the data communications radio receiver is currently synchronized with and the carrier wave that the data communications radio receiver was previously synchronized with no longer have fixed phase relationships relative to each other. The carrier wave of the feedback passband signal depends on the carrier waves of previous feedforward passband signals. Since the change in multipath distortion forces changed adjustment of the synchronization of the data communications radio receiver, the current feedforward passband signal is not in fixed relative phase relationship to these previous feedforward passband signals. The constancy of the relative phase relationship of the feedforward and feedback passband signals in the passband equalization filtering is disrupted, and the adaptation of the passband equalization filtering by the decision-feedback method fails to provide for cancellation of the dynamic ghost. The adaptation of the passband equalization filtering inverts the dynamic ghost, but delays it to occur at a different time than the non-canceled dynamic ghost. This specification terms this phenomenon "ghost iteration with inversion".

SUMMARY OF THE INVENTION

Adaptive passband equalization filtering that embodies the invention comprises in addition to a non-iterative portion, an iterative filtering portion to suppress longer-delayed post-ghosts. This iterative filtering portion differs from that in previous adaptive passband equalization filtering in which the estimates of transmitted symbols are converted to VSB signal and the feedback signal for the iterative filtering is generated as a weighted summation of successive samples of the VSB signal. Instead, a weighted summation of successive estimates of transmitted symbols is converted to VSB signal to supply the feedback signal for the iterative filtering. Since the conversion to VSB signal is done immediately before the feedback signal is combined with the feedforward signal to generate the passband equalization filtering response that is demodulated, the carrier wave of the feedback signal is currently determined, rather than having been determined in the past. This avoids "ghost iteration with inversion" in the adaptive passband equalization filtering response.

DETAILED DESCRIPTION

Figure 1:
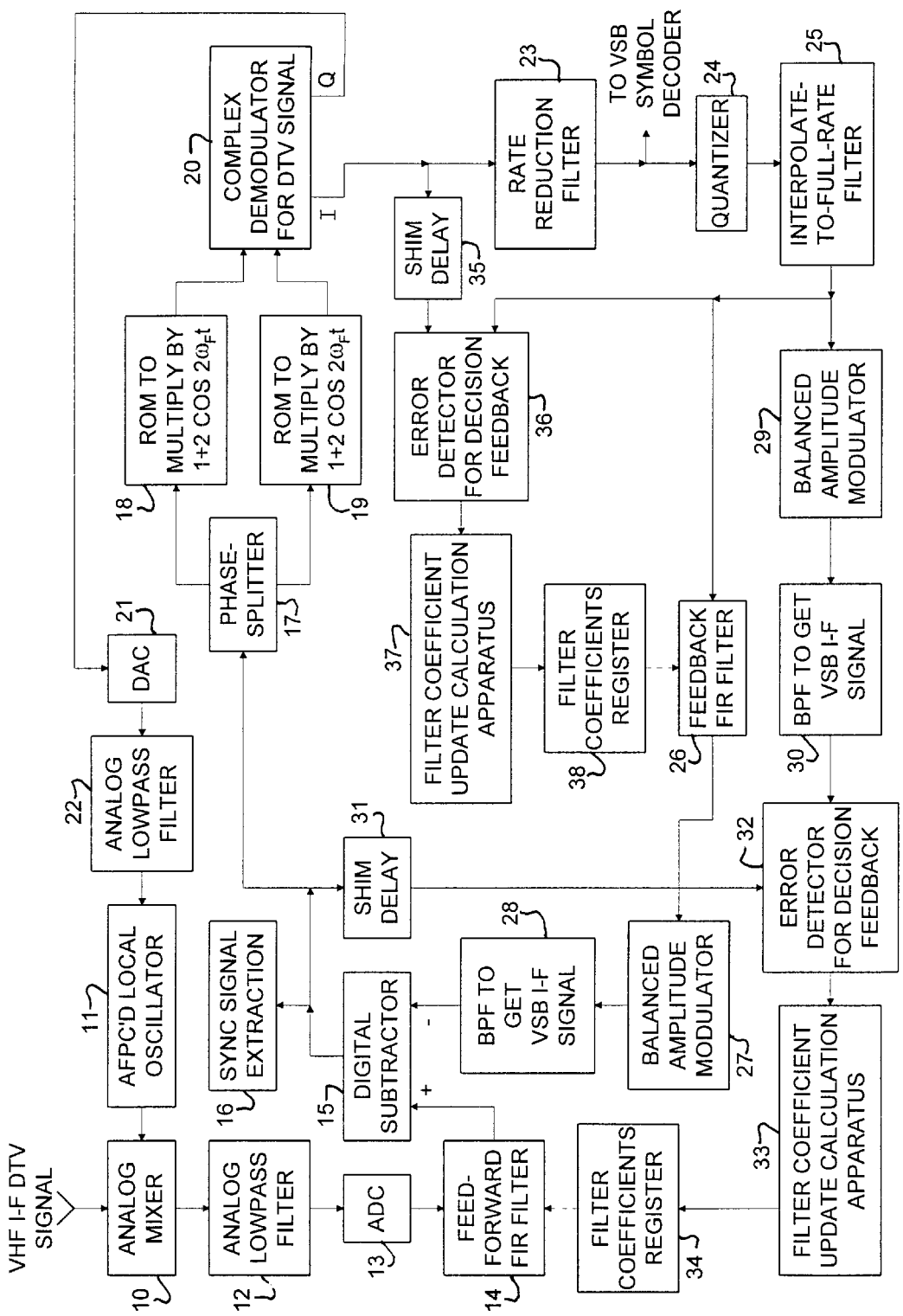
FIG. 1 is a block schematic diagram of portions of a digital television receiver including adaptive passband equalization filtering and demodulation apparatus embodying the invention.

In FIG. 1 a very-high frequency intermediate-frequency digital television signal is supplied to an analog mixer 10 for heterodyning with local oscillations from a local oscillator 11. The VHF I-F DTV signal is supplied to the analog mixer 10 from the final stage of a very-high frequency intermediate-frequency amplifier (not shown), which is subject to automatic gain control (AGC). The response of an analog lowpass filter 12 to the down-converted portion of the mixer 10 output signal is a final intermediate-frequency signal offset from zero frequency by a megahertz or so. This final I-F signal is digitized by an analog-to-digital converter 13 to generate a signal suitable for passband equalization filtering.

The digitized final I-F signal is applied as the input signal to an FIR digital filter 14 operated as a feedforward filter in a non-iterative portion of the passband equalization filtering. The feedforward response of the FIR digital filter 14 is supplied as minuend input signal to a digital subtractor 15. The subtrahend input signal to the digital subtractor 15 is a feedback response from an iterative portion of the passband equalization filtering that will be described further on in this specification. The difference output signal from the digital subtractor 15 is the passband equalization filtering response.

Synchronizing signal extraction circuitry 16 responds to the difference output signal from the digital subtractor 15. The synchronizing signal extraction circuitry 16 typically includes match filtering for data field synchronizing (DFS) signal, match filtering for data segment synchronizing (DSS) signal, and symbol-frequency sub-harmonic extraction circuitry. The symbol-frequency sub-harmonic signal is used to synchronize the sampling clock generation circuitry that supplies clocking signal to the ADC 13 and that supplies count input signal to a sample counter that counts the samples in one or more data fields. The DFS signal and in some cases the DSS signal are used to synchronize the sample count to received DTV signals. Less significant bits of the sample count are used to address the read-only memories that generate the digital carrier waves used in demodulation. The sample count is analyzed to determine when the initial lines of data fields occur, and the DFS signals occurring during those lines are used as training signal for the passband equalization filtering as described by the inventor in earlier disclosures.

The passband equalization filtering response supplied from the subtractor 15 as its difference output signal is supplied to a phase-splitter 17 to be converted to complex samples. The phase-splitter 17 supplies a stream of real samples to a read-only memory 18 to be multiplied by $(1+\cos \omega_F t)$, where $\omega_F$ is twice the carrier frequency of the final I-F signal in radians per second. This converts the VSB digitized final I-F signal to a digitized final I-F signal with a DSB AM component that facilitates demodulation. The ROM 18 is addressed by the phase-splitter 17 real output signal and less significant bits of the sample count. The phase-splitter 17 supplies a stream of imaginary samples to a read-only memory 19 to be multiplied by $(1+\cos \omega_F t)$. This converts the Hilbert-transformed VSB digitized final I-F signal to a digitized final I-F signal with a DSB AM component that facilitates demodulation. The ROM 19 is addressed by the phase-splitter 17 imaginary output signal and less significant bits of the sample count. The product output signals from the ROMs 18 and 19 are supplied to a complex demodulator 20 for DTV signal.

Phase-splitting is done before conversion from VSB to DSB AM to keep the highest frequency to be phase-split as low as possible. This is because the digital filtering in the phase-splitter must be done at a sampling rate at least four times that highest frequency in order that its real and imaginary components of phase-splitter output signal can be maintained in quadrature with each other. Conversion from VSB to DSB AM increases the highest frequency in the signal by 5.7 MHz. Phase-splitting after conversion from VSB to DSB AM requires a substantially higher system sampling rate, more than 48 MHz. Phase-splitting before conversion from VSB to DSB AM requires a system sampling rate at least 27 MHz, which is sufficient to support the conversion of the complex digital final I-F signal from VSB to DSB AM.

The complex demodulator 20 comprises a complex digital multiplier receiving the product output signals from the ROMs 18 and 19 as a complex multiplicand input signal and receiving as a complex multiplier input signal samples of a complex digital carrier wave as drawn from sine and cosine look-up tables in ROM addressed by sample count. The quadrature-phase (Q) response of the complex demodulator 20 is supplied to a digital-to-analog converter 21, and the DAC 21 response is lowpass filtered by an analog lowpass filter 22 to generate automatic-frequency-and-phase-control (AFPC) signal for the local oscillator 11. The in-phase (I) response of the complex demodulator 20 of regenerates baseband symbol code.

The in-phase (I) response of the complex demodulator 20 is supplied to a rate-reduction filter 23 that reduces sampling rate of the regenerated baseband symbol code to symbol code rate. The response of the rate-reduction filter 23 is supplied to the symbol decoder in a later portion of the DTV receiver, which symbol coder can by way of example be of Viterbi type. The response of the rate-reduction filter 23 is supplied to a quantizer 24, which estimates the symbol that was transmitted and supplies the value of that symbol to an interpolation filter 25 for re-sampling to the sampling rate used in passband equalization filtering.

In accordance with the invention, the stream of re-sampled estimates of transmitted symbols supplied as the interpolation filter 25 response is supplied to an FIR digital filter 26 operated as a baseband feedback filter in the iterative portion of the passband equalization filtering. The baseband response of the FIR digital filter 26 is applied as modulating signal to a balanced amplitude modulator 27, therein to modulate a carrier that is the same as the real portion of the complex digital carrier that the complex demodulator 20 uses to demodulate the digitized final I-F signal. The balanced amplitude modulator 27 supplies the resulting DSB AM signal as input signal to a digital bandpass filter 28, which responds to supply a VSB signal as subtrahend input signal to the subtractor 15.

The stream of re-sampled estimates of transmitted symbols supplied as the interpolation filter 25 response is also supplied to a balanced amplitude modulator 29 as modulating signal, therein to modulate a carrier that is the same as the real portion of the complex digital carrier that the complex demodulator 20 uses to demodulate the digitized final I-F signal. The balanced amplitude modulator 29 supplies the resulting DSB AM signal as input signal to a digital bandpass filter 30, which responds to supply a VSB signal estimated to correspond to that originally transmitted. The passband equalization filtering response supplied from the digital subtractor 15 as its difference output signal and delayed by shim delay 31 is supplied to an error detector 32 for comparison with this VSB signal estimated to correspond to that originally transmitted. The detected difference between these input signals to the error detector 32 provides the error signal for decision feedback calculations performed in an apparatus 33 for calculating filter coefficient updates to be combined with filter coefficients already present in a filter coefficients register 34. The register 34 stores the respective weights used by the feedforward FIR filter 14 in weighted summation of differently delayed responses to the digitized final I-F signal supplied from the ADC 13. The adaptation procedure for the feedforward FIR filter 14 is similar to that described in patent applications Ser. No. 9/335,516 and No. 60/130,566, except that feedback filter coefficients are calculated differently.

In accordance with the invention, an error detector 35 compares the stream of re-sampled estimates of transmitted symbols supplied as the interpolation filter 25 response with the in-phase (I) response of the complex demodulator 20 as delayed by shim delay 36. The shim delay 36 compensates for latent delays in the filters 23 and 25. The detected difference between these input signals to the error detector 35 provides the error signal for decision feedback calculations performed in an apparatus 37 for calculating filter coefficient updates to be combined with filter coefficients already present in a filter coefficients register 38. The register 38 stores the respective weights used by the feedback FIR filter 26 in weighted summation of differently delayed responses to the interpolation filter 25 response. The decision feedback calculations are similar to those used in baseband equalization described by.

A. L. R. Limberg in provisional U.S. patent application Ser. No. 60/097,614 filed Aug. 24, 1999 and titled "ADAPTIVE FRACTIONALLY SPACED EQUALIZER FOR RECEIVED RADIO TRANSMISSIONS WITH DIGITAL CONTENT, SUCH AS DTV SIGNALS". However, coefficients that would be associated with pre-ghosts are not used and so need not be calculated.

Figure 2:
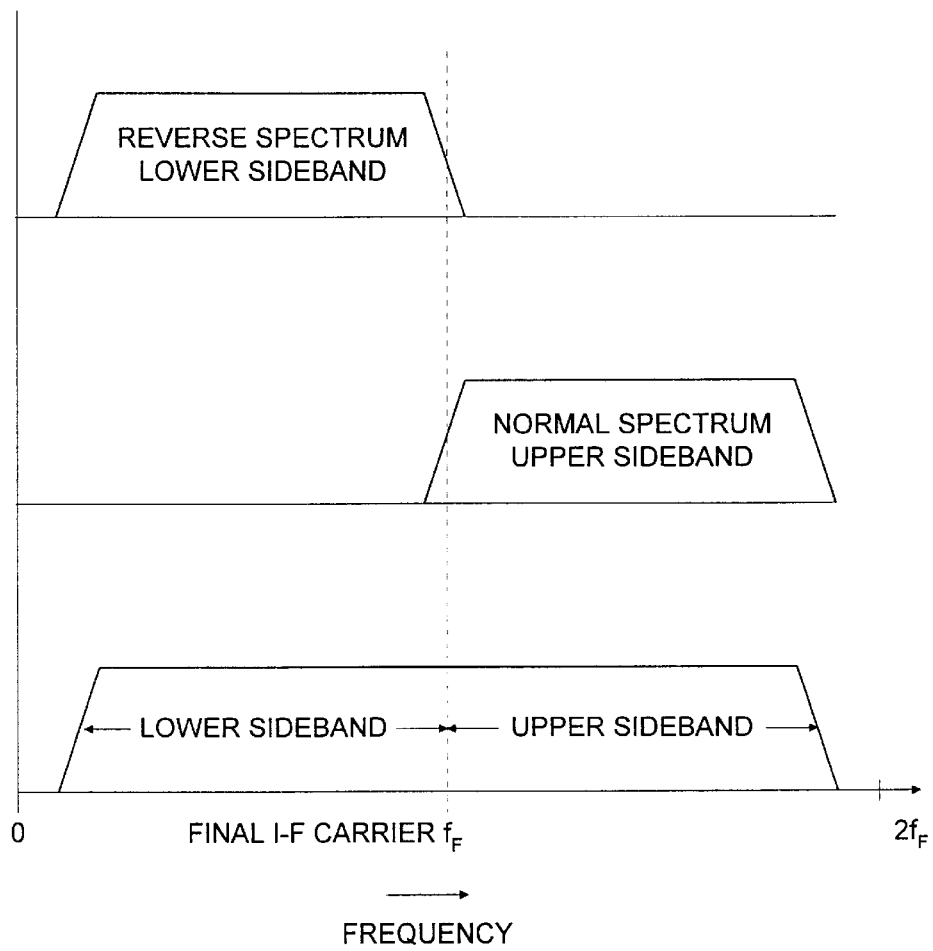
FIG. 2A is a diagram of a reverse-frequency-spectrum lower-vestigial-sideband amplitude-modulation component of the digitized final intermediate-frequency signal that is preferred when passband equalizing and demodulating in the FIG. 1 apparatus, which reverse-frequency-spectrum component is plotted as an ordinate against a frequency abscissa.
FIG. 2B is a diagram of normal-frequency-spectrum upper-vestigial-sideband amplitude-modulation component of the digitized final intermediate-frequency signal that is generated by heterodyning the passband equalizing response with the second harmonic of the carrier of the final digitized final intermediate-frequency signal in preferred forms of the FIG. 1 apparatus, which normal-frequency-spectrum component is plotted as another ordinate against the same frequency abscissa as the frequency-spectrum component of FIG. 2A.
FIG. 2C is a diagram of the frequency spectrum of the double-sideband amplitude-modulation digitized final intermediate-frequency signal that obtains when the frequency spectra of FIGS. 2A and 2B are combined in the FIG. 1 apparatus, which complete DSB AM final I-F signal spectrum is plotted as yet another ordinate against the same frequency abscissa as the frequency-spectrum components of FIGS. 2A and 2B.

FIG. 2A diagrams the reverse-frequency-spectrum lower-VSB AM component of the digitized final IF signal that is preferred when passband equalizing and demodulating in the FIG. 1 apparatus. The nominal frequency of the local oscillator 11 is chosen so that it heterodynes with the VSB I-F signal in the analog mixer 10 to produce a lower sideband with pilot carrier at its higher frequency end. The lowest frequency of the VSB final I-F signal is offset from zero frequency by a megahertz or so, so that design of the phase-splitter 17 is practical. The carrier of the VSB final I-F signal should be in a simple rational ratio with the full sampling rate in the system, so that digital carrier can be generated simply from look-up tables stored in read-only memory addressed by sample count. The full-rate sampling frequency is preferably in a simple rational ratio with the 10.76 MHz symbol rate, so that spectral line methods can be employed for determining the full sampling rate in the system, from which full sampling rate decimated sampling rates can be determined. The full sampling rate must exceed twice the highest frequency in the DSB AM final I-F signal generated for application to the complex demodulator 20 in order that the Nyquist criterion be satisfied.

Placing the carrier of the final I-F signal at two-thirds symbol rate, or about 7.17 MHz, facilitates operation with a system sampling rate of eight-thirds symbol rate, or about 28.68 MHz. The lowest frequency in the final I-F signal is offset from zero frequency by almost 1.5 MHz.

Placing the carrier of the final I-F signal at five-eighths symbol rate, or about 6.72 MHz, facilitates operation with a system sampling rate of five-halves symbol rate, or about 26.90 MHz. The lowest frequency in the final I-F signal is offset from zero frequency by slightly more than one MHz. The number of samples required in the passband equalization filtering is reduced six per cent or so.

Figure 3:
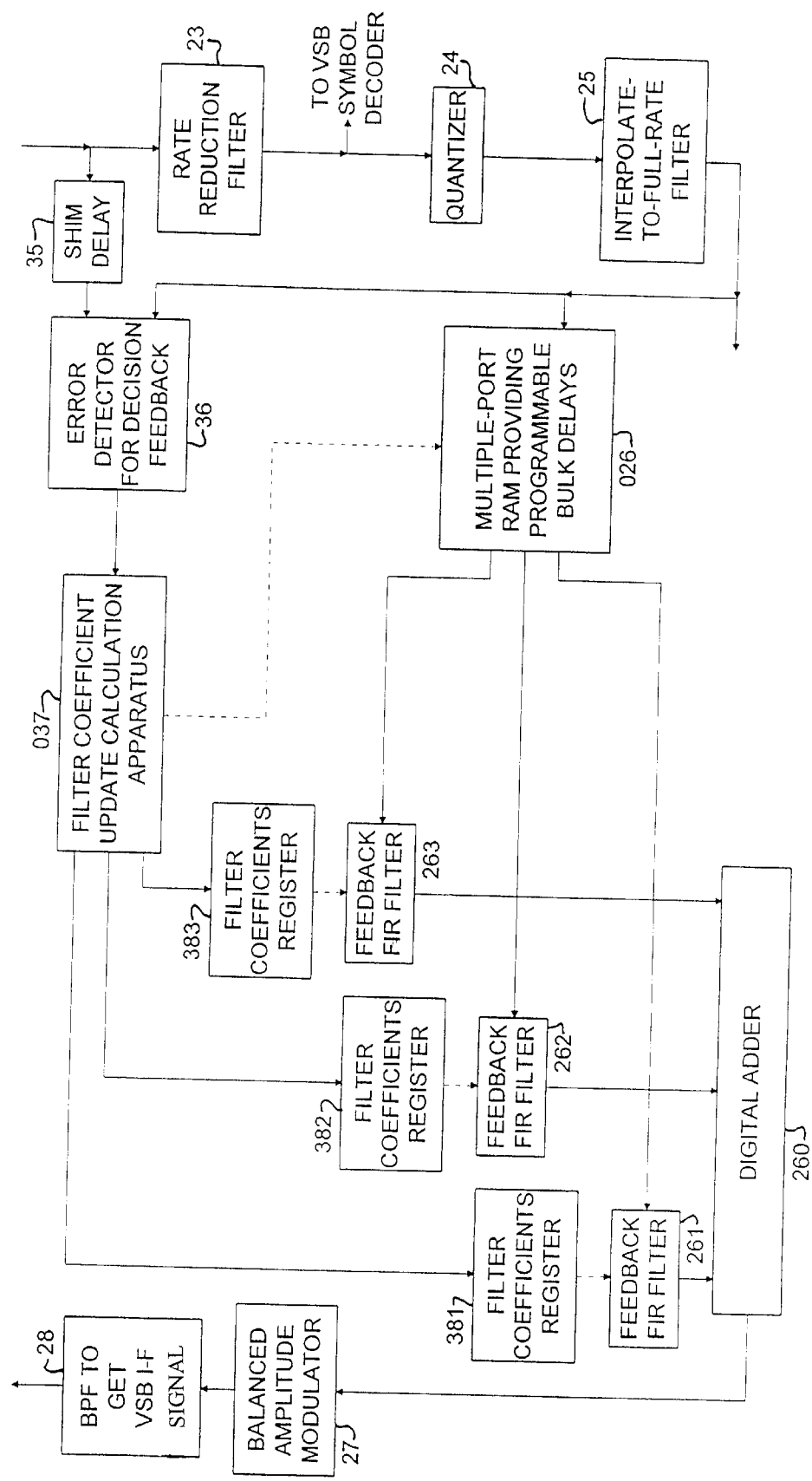
FIG. 3 is a block schematic diagram of a modification of the FIG. 1 portions of a digital television receiver including adaptive passband equalization filtering and demodulator apparatus, which modified FIG. 1 apparatus is another embodiment of the invention.

FIG. 3 shows how the FIG. 1 passband equalization and ghost-cancellation filtering can be modified to reduce the number of multipliers required in the iterative portions of the filter. In the FIG. 1 passband equalization and ghost-cancellation filtering most of the weighting coefficients stored in the filter coefficients register 38 will be zero-valued. Weighting coefficients that are not zero-valued will occur in groups that are closely packed in terms of delay, which groups are separated by sequences of weighting coefficients that are essentially zero-valued. The apparatus 37 for calculating filter coefficient updates to be combined with filter coefficients already present in the filter coefficients register 38 is replaced in the FIG. 3 modification by more sophisticated calculating apparatus 037. The calculating apparatus 037 determines where groups of weighting coefficients that are not zero-valued and that are closely packed in terms of delay begin and end. These groups of non-zero weighting coefficients are stored in respective filter coefficients registers 381, 382, 383, that are relatively small portions of the filter coefficients register 38 that they replace. Much of the portions of the filter coefficients register 38 that would have stored essentially zero-valued coefficients are dispensed with in the FIG. 3 modification. The filter coefficients registers 381, 382, 383 apply the weighting coefficients they store to adaptive FIR filters 261, 262, 263, respectively, that together with a digital adder 260 that sums the responses of these FIR filters would be corresponding portions of the FIG. 1 feedback FIR filter 26 delay line and weighted summation structure.

The adaptive FIR filters 261, 262, 263 are arranged to receive the same input signals as they would have in the FIG. 1 feedback FIR filter 26 delay line and weighted summation structure. A multiple-port random-access memory 026 is cyclically addressed by sample count for full-rate samples for being written via its random-access port by the response of the interpolation filter 25. The RAM 026 will store the samples that occur in a time interval somewhat longer than the differential delay associated with the longest multipath—e.g., fifty microseconds or so. The more significant bits of sample count are used for row-addressing the RAM 026 and the less significant bits of sample count are used for column-addressing the RAM 026. Row length in the RAM 026 is half the length of the respective delay line of each of the adaptive FIR filters 261, 262, 263. Responsive to its determination where each group of weighting coefficients that are not zero-valued and that are closely packed in terms of delay begins, the calculating apparatus 037 specifies an offset from sample count. This offset is added to sample count to determine a read address that is used to control serial read-out from a respective serial port of the RAM 026 to the input port of a respective one of the adaptive FIR filters 261, 262, 263.

Figure 4:
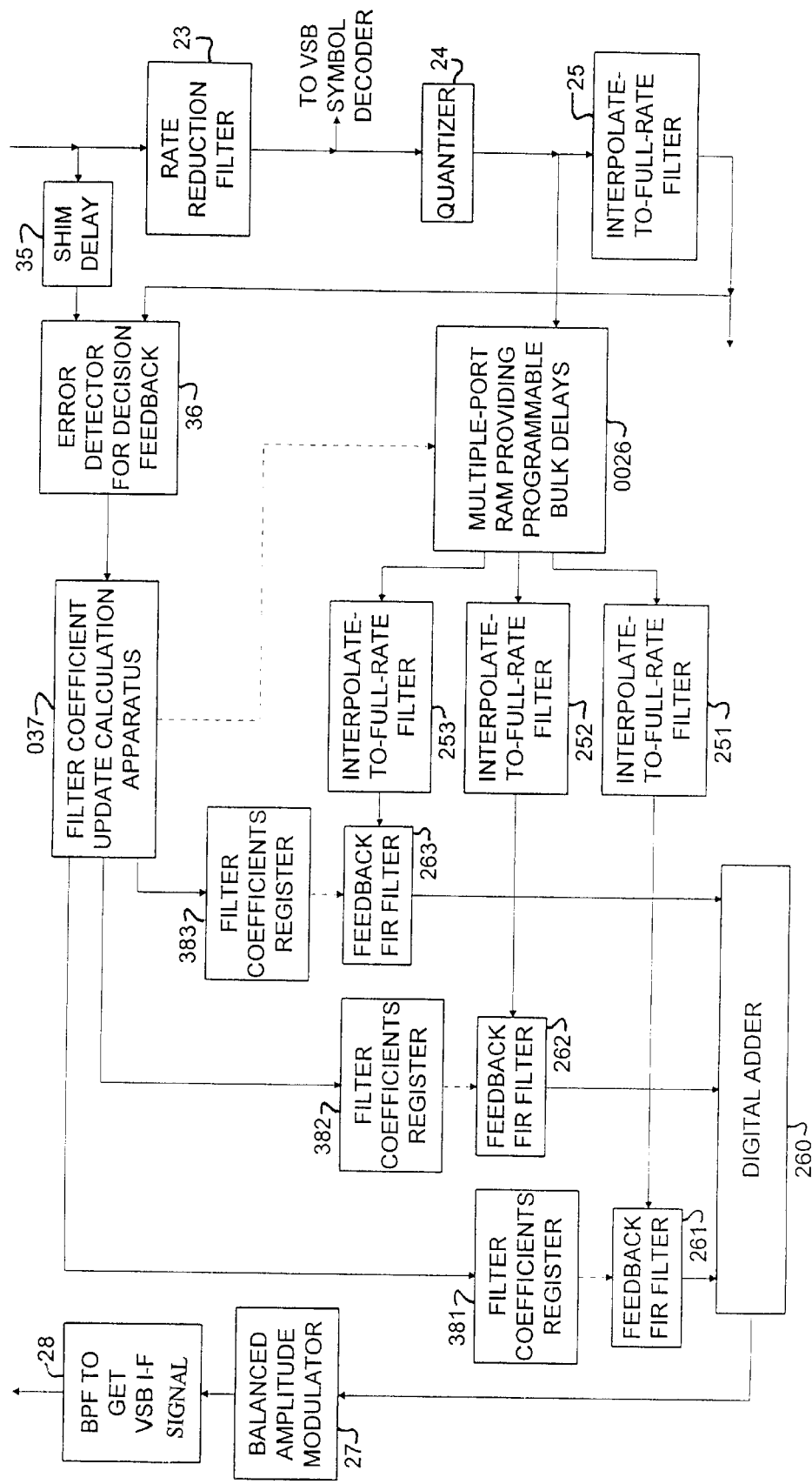
FIG. 4 is a block schematic diagram of a further modification of the FIG. 1 portions of a digital television receiver including adaptive passband equalization filtering and demodulator apparatus, which further-modified FIG. 1 apparatus is another embodiment of the invention.

FIG. 4 shows a variant of the FIG. 3 modification in which the ROM 026 for storing full-rate samples from the interpolation filter 25 response to quantizer 24 output signal is replaced by a multiple-port random-access memory 0026 that is cyclically addressed by sample count of symbol-rate samples for being written via its random-access port by samples of the quantizer 24 output signal. The output signals from the serial output ports of the RAM 0026 are converted to full-rate sampling by interpolation filters 251, 252, 253, respectively, for application as input signals to the adaptive FIR filters 261, 262, 263, respectively.

The modifications of the FIG. 1 passband equalization and ghost-cancellation filtering shown in FIGS. 3 and 4 are capable of suppressing three discrete post-ghosts. In a practical design that is commercially acceptable, the FIGS. 3 and 4 circuitry is modified to be capable of suppressing five or six discrete post-ghosts. The adaptive FIR filters 261, 262, 263 are augmented by further adaptive FIR filters supplying their responses to the digital adder 260, expanded to accept further summand input signals. The further adaptive FIR filters are provided respective filter coefficients registers, and the multiple-port RAM is replaced by a multiple-port RAM with more serial output ports.

What is claimed is:

1. A radio receiver as for inclusion in a digital television receiver, said radio receiver receiving digital modulation of a prescribed symbol rate and comprising:

a local oscillator for supplying controlled local oscillations at a frequency and phase controlled in response to an automatic frequency and phase control signal;

conversion circuitry for heterodyning received signal with said controlled local oscillations to generate a final intermediate-frequency signal;

a first finite-impulse-response adaptive digital filter connected for supplying, as its output signal, first finite-impulse-response adaptive digital filter response to its input signal;

first filter coefficient update calculation apparatus for generating in response to a first decision feedback signal adaptive parameters for said first finite-impulse-response adaptive digital filter;

an analog-to-digital converter for digitizing said final intermediate-frequency signal at a system sampling rate higher than said prescribed symbol rate, to generate an analog-to-digital converter response supplied to said first finite-impulse-response adaptive digital filter as its said input signal;

a second finite-impulse-response adaptive digital filter connected for supplying, as its output signal, second finite-impulse-response adaptive digital filter response to its input signal;

second filter coefficient update calculation apparatus for generating in response to a second decision feedback signal adaptive parameters for said second finite-impulse-response adaptive digital filter;

a first amplitude modulator connected for modulating a digital carrier in accordance with said second finite-impulse-response adaptive digital filter response to generate a digitized first double-sideband amplitude-modulation signal;

a first bandpass filter connected for receiving said digitized first double-sideband amplitude-modulation signal as its input signal and for supplying digitized first vestigial-sideband amplitude-modulation signal as its output signal applied as said input signal to said second finite-impulse-response adaptive digital filter;

a digital subtractor connected for differentially combining said first finite-impulse-response adaptive digital filter response and said second finite-impulse-response adaptive digital filter response to generate a difference signal that is an overall adaptive filter response to said final intermediate-frequency signal;

complex demodulator circuitry for demodulating said difference signal that is an overall adaptive filter response to said final intermediate-frequency signal, thereby to generate an in-phase baseband demodulation result and a quadrature-phase baseband demodulation result;

circuitry for generating, in lowpass filter response to said quadrature-phase baseband demodulation result, said automatic frequency and phase control signal for said local oscillator;

a rate reduction filter connected to receive as its input signal said in-phase baseband demodulation result from said complex demodulator circuitry and to supply as its output signal said in-phase baseband demodulation result as resampled to symbol rate;

a quantizer for generating estimates of transmitted symbols responsive to said in-phase baseband demodulation result as re-sampled to symbol rate;

an interpolation filter connected to receive as its input signal said estimates of transmitted symbols and to supply as its output signal said estimates of transmitted symbols as re-sampled to system sample rate, said interpolation filter connected to apply said estimates of transmitted symbols as re-sampled to system sample rate to said second finite-impulse-response adaptive digital filter as said input signal thereof;

a second amplitude modulator connected for modulating a digital carrier in accordance with said estimates of transmitted symbols to generate a digitized second double-sideband amplitude-modulation signal;

a second bandpass filter connected for receiving said digitized second double-sideband amplitude-modulation signal as its input signal and for supplying digitized second vestigial-sideband amplitude-modulation signal as its output signal;

a first error detector for comparing said difference signal that is an overall adaptive filter response to said final intermediate-frequency signal with said digitized second vestigial-sideband amplitude-modulation signal to generate said first decision feedback signal; and a second error detector for comparing said in-phase baseband demodulation result from said complex demodulator circuitry with the output signal of said interpolation filter to generate said second decision feedback signal.

2. The radio receiver of claim 1, wherein said second finite-impulse-response adaptive digital filter is of a type that includes circuitry for providing programmable bulk delays between groups of weighting coefficients in said second finite-impulse-response adaptive digital filter.

3. The radio receiver of claim 1, wherein said second finite-impulse-response adaptive digital filter comprises:

a digital adder for supplying said second finite-impulse-response adaptive digital filter as the sum of N summand input signals, N being an integer larger than one;

a plurality N in number of component finite-impulse-response adaptive digital filters supplying their respective responses to their respective input signals to said digital adder as respective ones of its N summand input signals; and multi-port random access memory having an input port connected to receive said estimates of transmitted symbols as re-sampled to system sample rate that said interpolation filter supplies as output signal therefrom, said multi-port random access memory having a plurality of output ports N in number for supplying said estimates of transmitted symbols as re-sampled to system sample rate and subjected to respective programmable bulk delays, each output port of said multi-port random access memory connected for supplying the input signal to a respective one of said plurality N in number of component finite-impulse-response adaptive digital filters.

4. A radio receiver as for inclusion in a digital television receiver, said radio receiver receiving digital modulation of a prescribed symbol rate and comprising:

a local oscillator for supplying controlled local oscillations at a frequency and phase controlled in response to an automatic frequency and phase control signal;

conversion circuitry for heterodyning received signal with said controlled local oscillations to generate a final intermediate-frequency signal;

a first finite-impulse-response adaptive digital filter connected for supplying, as its output signal, first finite-impulse-response adaptive digital filter response to its input signal;

first filter coefficient update calculation apparatus for generating in response to a first decision feedback signal adaptive parameters for said first finite-impulse-response adaptive digital filter;

an analog-to-digital converter for digitizing said final intermediate-frequency signal at a system sampling rate higher than said prescribed symbol rate, to generate an analog-to-digital converter response supplied to said first finite-impulse-response adaptive digital filter as its said input signal;

a second finite-impulse-response adaptive digital filter connected for supplying, as its output signal, second finite-impulse-response adaptive digital filter response to its input signal;

second filter coefficient update calculation apparatus for generating in response to a second decision feedback signal adaptive parameters for said second finite-impulse-response adaptive digital filter;

a first amplitude modulator connected for modulating a digital carrier in accordance with said second finiteimpulse-response adaptive digital filter response to generate a digitized first double-sideband amplitude-modulation signal;

a first bandpass filter connected for receiving said digitized first double-sideband amplitude-modulation signal as its input signal and for supplying digitized first vestigial-sideband amplitude-modulation signal as its output signal applied as said input signal to said second finite-impulse-response adaptive digital filter;

a digital subtractor connected for differentially combining said first finite-impulse-response adaptive digital filter response and said second finite-impulse-response adaptive digital filter response to generate a difference signal that is an overall adaptive filter response to said final intermediate-frequency signal;

complex demodulator circuitry for demodulating said difference signal that is an overall adaptive filter response to said final intermediate-frequency signal, thereby to generate an in-phase baseband demodulation result and a quadrature-phase baseband demodulation result;

circuitry for generating, in lowpass filter response to said quadrature-phase baseband demodulation result, said automatic frequency and phase control signal for said local oscillator;

a rate reduction filter connected to receive as its input signal said in-phase baseband demodulation result from said complex demodulator circuitry and to supply as its output signal said in-phase baseband demodulation result as resampled to symbol rate;

a quantizer for generating estimates of transmitted symbols responsive to said in-phase baseband demodulation result as re-sampled to symbol rate, said quantizer connected to apply said estimates of transmitted symbols as re-sampled to symbol rate to said second finite-impulse-response adaptive digital filter as said input signal thereof;

an interpolation filter connected to receive as its input signal said estimates of transmitted symbols and to supply as its output signal said estimates of transmitted symbols as re-sampled to system sample rate;

a second amplitude modulator connected for modulating a digital carrier in accordance with said estimates of transmitted symbols to generate a digitized second double-sideband amplitude-modulation signal;

a second bandpass filter connected for receiving said digitized second double-sideband amplitude-modulation signal as its input signal and for supplying digitized second vestigial-sideband amplitude-modulation signal as its output signal;

a first error detector for comparing said difference signal that is an overall adaptive filter response to said final intermediate-frequency signal with said digitized second vestigial-sideband amplitude-modulation signal to generate said first decision feedback signal; and a second error detector for comparing said in-phase baseband demodulation result from said complex demodulator circuitry with the output signal of said interpolation filter to generate said second decision feedback signal.

5. The radio receiver of claim 4, wherein said second finite-impulse-response adaptive digital filter is of a type that includes multi-port random access memory for providing programmable bulk delays between groups of weighting coefficients in said second finite-impulse-response adaptive digital filter.

6. The radio receiver of claim 4, wherein said second finite-impulse-response adaptive digital filter comprises:

a digital adder for supplying said second finite-impulse-response adaptive digital filter as the sum of N summand input signals, N being an integer larger than one;

a plurality N in number of component finite-impulse-response adaptive digital filters supplying their respective responses to their respective input signals to said digital adder as respective ones of its N summand input signals;

multi-port random access memory having an input port connected to receive said estimates of transmitted symbols as re-sampled to system sample rate that said interpolation filter supplies as output signal therefrom, said multi-port random access memory having a plurality of output ports N in number for supplying said estimates of transmitted symbols as re-sampled to system sample rate and subjected to respective programmable bulk delays; and a plurality N in number of further interpolation filters connected to receive respective input signals thereof from respective output ports of said multi-port random access memory, said further interpolation filters connected to apply their respective responses to respective ones of said component finite-impulse-response adaptive digital filters as their respective input signals.

* * * * *